IMMEDIATE RINGING EQUIPMENT FOR COMMUNICATION SYSTEMS

Filed Dec. 10, 1964 2 Sheets-Sheet 1

INVENTOR
L. F. GOELLER, JR.
BY [signature]
ATTORNEY

United States Patent Office 3,378,643
Patented Apr. 16, 1968

3,378,643

IMMEDIATE RINGING EQUIPMENT FOR COMMUNICATION SYSTEMS

Leopold F. Goeller, Jr., Holmdel Township, Monmouth County, N.J., assignor to Bell Telephone Laboratories, Incorporated, New York, N.Y., a corporation of New York Filed Dec. 10, 1964, Ser. No. 417,444
14 Claims. (Cl. 179—18)

ABSTRACT OF THE DISCLOSURE

A program controlled telephone system is disclosed having switching equipment which provides immediate ringing power to each called telephone at the instant that call connections are established to the called line. The equipment includes a distribution circuit which successively connects ringing power from a generator individually to each of a plurality of ringing control circuits so that continually at least one such control circuit has ringing power available for immediate connection to a called phone. Data processor facilities determine the control circuit presently having available ringing power and control its connection through the network to the called telephone.

This invention relates to signaling equipment and particularly to equipment utilized in telephone systems for altering called stations to the present of incoming calls. My invention further relates to facilities which reduce the time delays encountered in activating the electro-responsive device, such as a ringer, of a called phone after the receipt of a call.

It is often desirable in present day telephone systems to provide apparatus which activates the ringer of each called phone immediately after the establishment of call connections thereto. Such an immediate ringing facility would speedily alert each called party to the presence of an incoming call and thereby advantageously enable the call to be quickly answered. Thus, it would provide for fast telephone communication and reduce the holding times of ringing and switching equipments on each call.

A deficiency in prior art ringing arrangements is that inadequate facilities are furnished for insuring the aforementioned immediate ringing feature. In such arrangements, the activation of a telephone ringer may be delayed for as long as several seconds after the establishment of call connections to the called phone. This delay occurs because the power generator facilities of such arrangements customarily furnish bursts of ringing power at periodically recurring intervals and the actual needs for such power arise during the interburst intervals. To illustrate, typical generator facilities may furnish a two-second burst of ringing power every six seconds and the immediate needs for the power on called lines may arise at any time during each of the four-second interburst intervals.

In view of the foregoing, it is an object of my invention to reduce time delays encountered in altering a called party to the presence of an incoming call after such a call has been extended to the called telephone.

Another object is to improve ringing arrangements in a telephone system and thereby provide for faster telephone communications than in prior systems as well as for reduced holding times of ringing and switching equipments on each call.

These and other objects of my invention are attained in a spectific exemplary embodiment thereof comprising switching facilities which provide ringing power to each called telephone at the instant that call connections are established to the called line. These facilities include a power distribution circuit which successively connects ringing signals from a generator individually to each of a plurality of ringing control circuits so that continually at least one such control circuit has ringing signals available for immediate connection through the telephone switching network to a called phone. The distribution circuit is associated with scanner apparatus which monitors the ringing control circuits to ascertain which one of them currently has the immediately available ringing power. A program controlled data processor cooperates with the scanner apparatus both to store information as to which one of the monitored circuits presently has available ringing power and based on that information to operate that one circuit upon the receipt of a call so that the ringer of the called phone is quickly activated and the called party is speedily alerted to the incoming call.

Specifically, the power distribution circuit comprises a plurality of make contacts which are successively actuated by a sequence switch periodically to connect AC (alternating current) voltage superimposed on DC (direct current) voltage to each of a plurality of ringing output leads individually associated with one of the ringing control circuits. The distribution circuit also includes a plurality of break contacts which are successively actuated by the sequence switch to connect the DC voltage to each of the output leads during the periods when the AC voltage is disconnected therefrom. The DC voltage is so connected to the output leads during each period in order that the called party answer detecting circuit may be operable.

The scanner facilities comprise a plurality of ferrod sensor devices, described further hereinafter, and each of which is individually associated with one of the aforementioned output leads for monitoring when ringing power is either connected to or is shortly to be connected to that one lead. Each of these ferrod devices is activated by an individual make contact which is uniquely identified with one of the output leads and which is actuated by the sequence switch shortly before and during a portion of the period while the AC and DC voltages are both connected to the one output lead.

Each of the ferrods is periodically scanned under the control of the data processor to ascertain which one of the output leads has or is about to receive the AC and DC ringing voltages. This scanning operation enables the processor to store and utilize the information concerning the ringing control circuit which will supply ringing power to a called line with minimal delay upon the receipt of an incoming call.

A feature of my invention is the provision of switching facilities which monitor a plurality of ringing circuits to ascertain the instantaneous availability of ringing power at each of the circuits and which, in response to a call, further control the establishment of ringing connections between a called line and one of the monitored circuits having the instantly available power for activating the ringer of the called phone.

Another feature is the provision of a ringing power distribution circuit comprising an array of switching elements for successively connecting ringing power to each of a plurality of ringing control circuits and a switching configuration for supplying signals to a common control means which indicate the monitored circuit that instantly has ringing power connected thereto and thereby enable the control means to connect the latter circuit to a called line in response to the concurrent receipt of a call.

Another feature is the provision of a ringing source, a plurality of ringing leads, a sequence switch having a contact configuration operative for successively connecting the ringing source in series with each of the ringing leads, a plurality of signaling leads each connected with an individual ferrod sensor device which is individually associated with one of the ringing leads, a contact arrangement actuated by the sequence switch for supplying signals to each of the signaling leads to energize each of the ferrods shortly before and during a portion of the time that the ringing power is connected to the associated ringing lead, and a common control means activated for periodically scanning each of the ferrods to ascertain the instantaneous availability of ringing power on each of the ringing leads and being responsive to the receipt of a call for connecting the called line to the ringing lead ascertained to have instantaneously available ringing power.

The foregoing objects, advantages and features, as well as others, of this invention may become more apparent from the reading of the following description with reference to the drawing in which.

Figure 1:
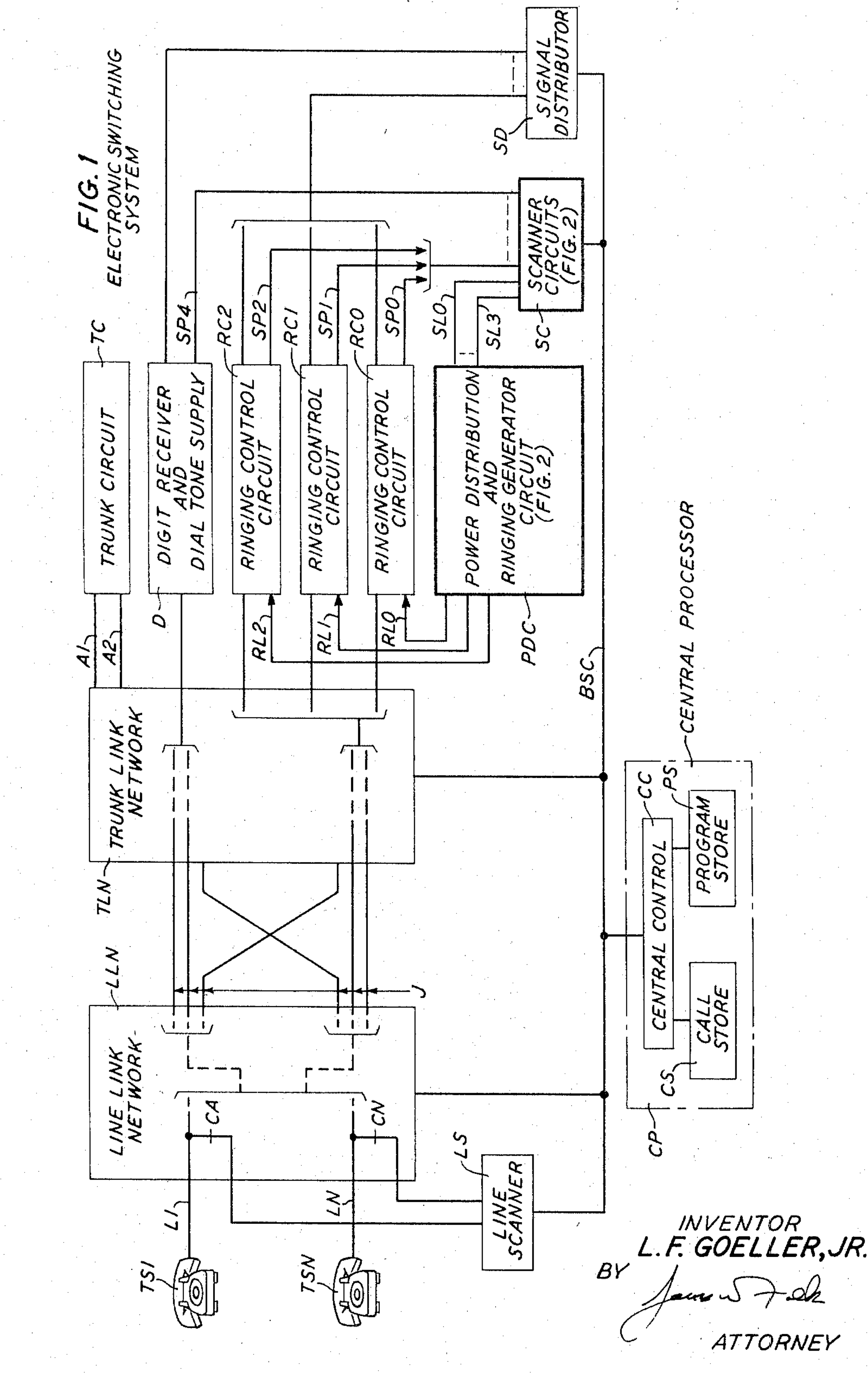
FIG. 1 is a block diagram of a program controlled telephone system employing ringing circuitry in accordance with my invention.

The equipment illustrative of the principles of my invention has been designed for incorporation, by way of example, into an electronic program controlled telephone system of the type disclosed in the copending A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963. It is particularly concerned with the power distribution and ringing generator circuit PDC and the scanner circuits SC depicted in heavy-lined blocks in FIG. 1. The other equipment elements are neither shown nor described in detail herein, except where necessary for a complete understanding of the present invention. The cited Doblmaier et al. disclosure and the patent applications referred to therein may be consulted for a complete understanding of the construction and operations of the signal distributor SD and scanners LS and SC of FIG. 1, as well as the other elements not disclosed in detail herein. While certain of the circuit details of the line and trunk link networks LLN and TLN of FIG. 1 are set forth in the Doblmaier et al. disclosure, more definite specifications of these networks are presented in the following copending patent applications: T. N. Lowry, Ser. No. 205,920, filed June 28, 1962, now U.S. Patent No. 3,231,679, issued Jan. 25, 1966; A. Feiner, Ser. No. 253,083, filed Jan. 22, 1963, now U.S. Patent No. 3,257,513, issued June 21, 1966; and K. S. Dunlap-A. Feiner-R. W. Ketchledge-H. F. May, Ser. No. 295,458, filed July 16, 1963, now U.S. Patent No. 3,281,539, issued Oct. 25, 1966. The ringing control circuits RC0–RC2 of FIG. 1 are disclosed in my copending patent application, Ser. No. 403,989, filed Oct. 15, 1964.

*General description*

The organization of the principal equipment units of the illustrative embodiment of my invention will now be described with reference to FIG. 1. The electronic switching system is designed to serve many different telephone stations, such as stations TS1–TSN, each of which is equipped with a telephone having a conventional ringer. These stations are connected to the switching office over the telephone lines L1–LN and are terminated in both the line scanner LS and the line link network LLN. The scanner LS is employed for sensing "on-hook" and "off-hook" signals representing requests for service on lines L1–LN.

The network LLN comprises switching facilities for establishing communication connections from the lines L1–LN to the trunk link network TLN via network wire junctors J. Similarly, the network TLN includes switching facilites for establishing connections from the junctors J to digit receivers and dial tone supply circuits, such as the circuit D, as well as to other functional circuits, such as trunk circuit TC. In addition, the network TLN is advantageously used for establishing connections from the junctors J to ringing control circuits, such as the circuits RC0–RC2. The latter connections are used for supplying ringing power to a called line. An advantage obtained from this use of the network TLN is that it establishes the talking path connections via trunk circuits, as well as the ringing paths needed for activating the ringers of called phones.

Unlike prior art ringing cricuits, the individual ringing control circuits RC0–RC2 each have an appearance in the system switching network which is used for supplying ringing power to the called line. In addition, these circuits are not associated with trunk circuits via special ringing selection switches as in prior art arrangements. Furthermore, the ringing circluits RC0–RC2 are each equipped with a ringing trip apparatus which eliminates the need for individual ringing trip relays in each of the trunk circuits of the system.

In accordance with my invention, ringing power is successively supplied to each of the ringing circuits RC0–RC2 from a ringing generator under control of the power distribution circuit PDC and via the ringing output leads RL0–RL2.

The ringing control circuits RC0–RC2 have no individual line supervisory relays for monitoring "on-hook" and "off-hook" conditions on the lines L1–LN during the servicing of calls. Similarly, the digit receivers do not comprise any digit registers as have heretofore been employed in prior art circuits. Instead, the ringing control circuits and the digit receivers are provided with a plurality of scan points, such as the points SP0–SP4 to which are applied the appropriate "on-hook," "off-hook" and digit signals. In like fashion, the power distribution circuit PDC is equipped with a plurality of scan points, or leads, SL0–SL3 to which it applies electrical signals signifying the instant availability of ringing power on the ringing leads RL0–RL2. Each of the scan points, or leads, is connected to the scanner circuits SC, which sense the applied signals for subsequent use by the central processor CP. The scanner circuits SC correspond generally to the trunk scanner and master scanner circuits depicted in FIG. 1 et seq. of the Doblmaier et al. disclosure.

In accordance with Doblmaier et al., a vast amount of the logic, control, storage, supervision and translation functions required for the operations of the ringing control circuits, digit receivers, scanner circuits and signal distributors, as well as other circuits of the electronic switching system are performed by the common control equipment comprising the central processor CP. Accordingly, a minimal amount of control circuitry is needed in the individual ringing circuits and receivers and only the essential switching devices and transmission apparatus are included therein. The operations of these switching devices are generally controlled by a signal distributor SD which acts as a buffer between the high-speed central processor CP and the relatively slow-speed switching devices to provide for the operation of the devices whereby the circuits are switched into different functional states required for serving calls.

Communications between the distributor SD, scanner circuits LS and SC, and processor CP are by way of bus systems and multiconductor cables which provide discrete communication paths between selected ones of the circuits. These bus systems and cables are described in Doblmaier et al. and are represented herein by the bus systems and cables BSC.

As set forth in Doblmaier et al. the processor CP is a centralized data processing facility which is employed to implement the various telephone administrative and maintenance functions of the switching system. It is divided functionally into three units comprising a call store CS, program store PS and a central control CC. The call store CS is a temporary or erasable memory facility which employs apparatus for storing information pertaining to the immediate availability of ringing power at each of the ringing control circuits RC0–RC2 and to calls in progress. With respect to the progress of calls, such information includes: (1) the busy-idle status of communication paths through the line and trunk link networks LLN and TLN, (2) the digits received from a digit receiver D, and (3) the information required for connecting the appropriate ringing circuit RC0–RC2 to the called line for instantaneous ringing.

The program store PS is a semipermanent memory facility which is employed to store the less changing system information including the system programs and a variety of translation information, such as the directory number to line equipment location data. Translation facilities are also furnished in the program store PS for deriving semi-permanent information required for routing, charging, ringing and the like on telephone calls.

The central control CC is the primary information processing unit of the system. It is capable of executing one at a time many different types of basic instructions, or orders, required for controlling the line and trunk link networks, digit receivers and ringing circuits as well as other functional circuits during calls. These instructions are written in the form of programs which are stored in the program store PS. The programming instructions are the vocabulary of the machine and are used to inform the switching circuits of the system how and when to perform their various functions. The central control CC requests an instruction from the program store every few microseconds and, upon receiving it, executes or commands the appropriate circuit or circuits to carry out the appropriate functions. Accordingly, the central control CC is the hub of the system which receives back all answers from those circuits. It is important to note, however, that the central control CC is capable only of executing individual instructions and that the mechanized intelligence required to supply the instructions needed for the complex telephone functions of the system resides in the store programs.

The actual programs utilized for controlling the immediate ringing operations described herein are at the discretion of the system programmer and his decisions are based on call traffic requirements.

Turning now to the manner in which the system serves a telephone call, an intra-office call will be described as it is suitable for explaining and obtaining a full understanding of the immediate ringing features of my invention. Such a call is initiated from a customer station, such as station TS1, and it is completed via the switching system to a customer station such as station TSN. When the caller at station TS1, for example, removes the telephone handset from its cradle, an "off-hook" signal is sensed by the scanner LS as set forth in the Doblmaier et al. disclosure. Subsequently, the central control CC, in executing a line scanning operation, interrogates the scanner LS and reads-out the "off-hook" condition. It then consults the busy-idle information stored in the call store CS for each line to insure that the "off-hook" condition has not been previously observed for line L1. Upon ascertaining that line L1 was previously "on-hook," the central control CC concludes that a call origination has occurred and it updates the busy-idle information for line L1 in the store CS. The central control CC knows the scanner address of line L1 and uses it to refer to a translation area in the program store PS which provides it with all of the service information it needs concerning the line L1.

The central control CC then selects an idle digit receiver and dial tone supply D. Next, the central control CC ascertains the availability of an idle path from the line L1 through the networks LLN and TLN and a junctor J to the receiver and dial tone supply D. Upon finding such a path, the control CC sends orders to the networks LLN and TLN to establish the appropriate switching connections. Thereafter, the scanner LS is disconnected from the line L1 when the network LLN opens the cutoff contacts CA and thereby avoids any transmission degradations over the line L1 due to the scanner circuitry. The central control CC then requests the distributor SD to operate apparatus on the receiver and dial tone supply D for causing dial tone to be sent to the calling line L1.

After the call connections to receiver D have been established, the control CC scans the calling line every few milliseconds via the scanner circuits SC in a manner as set forth in Doblmaier et al. This scanning operation is performed to check for the early abandonment of the call and for dial or TOUCH-TONE pulses. An abandoned call is signified by a prolonged "on-hook" condition on line L1. Such a condition is sensed by the scanner SC and read-out by the processor CP as described in Doblmaier et al. Each time the control CC scans the calling line, it compares the present scanner reading with the immediately preceding one which is recorded in the call store CS. Whenever a disagreement is found by the comparison and the calling telephone is found to be "on-hook" on the next scanning operation, the control CC recognizes that a digit is being transmitted and adds one to the pulse count kept in the call store CS for the call. A digit is deemed complete when the calling line is "off-hook" and no momentary "on-hook" change has been detected for a predetermined interdigital period.

When the central control CC receives the first digit pulse transmitted by the station TS1, it causes the dial tone transmission to be interrupted as set forth in Doblmaier et al.

After the called number has been received, the control CC effects a translation of that number to obtain call routing and signaling information which is needed to complete the call to the called station, for example station TSN. On receipt of the last digit of the called station number, the control CC converts that number to an address in the program store PS to ascertain the line equipment number and terminating class features of the called line. The control thereafter converts the received line equipment number to the location of the line busy-idle data in the call store CS in a manner as set forth in Doblmaier et al. This data informs the control CC when the called line is idle and enables the call store CS subsequently to mark the line LN busy. In addition, the control CC signals the call store to record the information it needs during the ringing phases of the call. The central control also allocates an idle intra-office trunk circuit TC for use on the call. Thereafter, the control CC reserves an available communication channel through the switching networks TLN and LLN between the calling line and the intra-office trunk circuit appearance A1.

While the call from line L1 has been in progress as previously explained, the central processor CP has been cooperating over the bus system BSC with the scanner circuits SC to scan the leads SL0–SL3 for ascertaining which of the ringing control circuits RC0–RC2 currently has or is shortly to have ringing power supplied to it. Accordingly, when the call advances to the point where the ringer of the called phone is to be activated, the processor selects and establishes the communication path between line LN and that one of the ringing control circuits RC0–RC2 which is able to supply instantaneous ringing power. The processor CP also selects, reserves and records in the call store CS a path from the calling to the called line via the line and trunk link networks, appearances A1 and A2, and intra-office trunk circuit TC. The digit receiver and dial tone supply D is then released, and its network path and the equipment involved in registering the called number are marked idle in the memory facilities of the processor CP. Afterwards, the control CC records in the call store the network path reserved for the talking connection. It also records the network location of the selected ringing control circuit.

After the communication path between line LN and the selected ringing control circuit have been established, the processor CP sends orders to the signal distributor SD to activate the selected ringing circuit so that it tests sequentially for a foreign potential and an excessively low leakage resistance on the line LN. When the tests reveal that the line LN is free from such a potential and resistance, the processor CP sends orders via the bus BSC to the distributor SD for activating switching devices in the selected ringing control circuit which connect instantaneously available ringing power from the generator PDC to the called line. The application of ringing current to the line LN is sensed by the scanner circuits SC during the ringing of the called phone and, accordingly, they cooperate with the processor CP to determine that the call is progressing satisfactorily.

When the called customer answers, the ringing circuit RC automatically trips ringing and cooperates with the circuits SC to notify the processor CP of the answer condition. Shortly afterwards, the processor CP cooperates with the distributor SD to deactivate the selected ringing control circuit for both opening the paths from the circuit to the network TLN and for returning it to its idle state. The processor CP then proceeds to establish a talking connection through networks LLN and TLN, appearances A1 and A2 and the trunk circuit TC. The processor effects the establishment of the call connections by supplying command signals via bus BSC to the networks LLN and TLN as well as to circuit TC via the distributor SD. The signals applied to circuit TC provide for a loop around transmission path between the appearances A1 and A2. The call conversation may then be in progress between the calling and called parties. While the call is in progress, circuit TC is periodically scanned via the scanner circuits SC under control of the processor to detect when the call is terminated.

After the caller or called party replaces the telephone handset in its cradle, a call disconnect signal may be sensed by the scanner circuits SC and it is subsequently read-out by the processor CP during the scanning operation. The processor CP then initiates a timing interval as a safeguard against a false "on-hook" signal. When the timing has been completed, and assuming that the calling line L1 receives an "on-hook" signal first, the call connections from the line L1 to trunk circuit TC are released. Scanner circuits SC and processor CP then await an "on-hook" supervision signal from the line LN and, upon its receipt, circuit TC is switched back to its idle state under control of the processor CP and distributor SD. Subsequently, the call connections through networks LLN and TLN are released.

*Detailed description*

Figures 2, 2A:
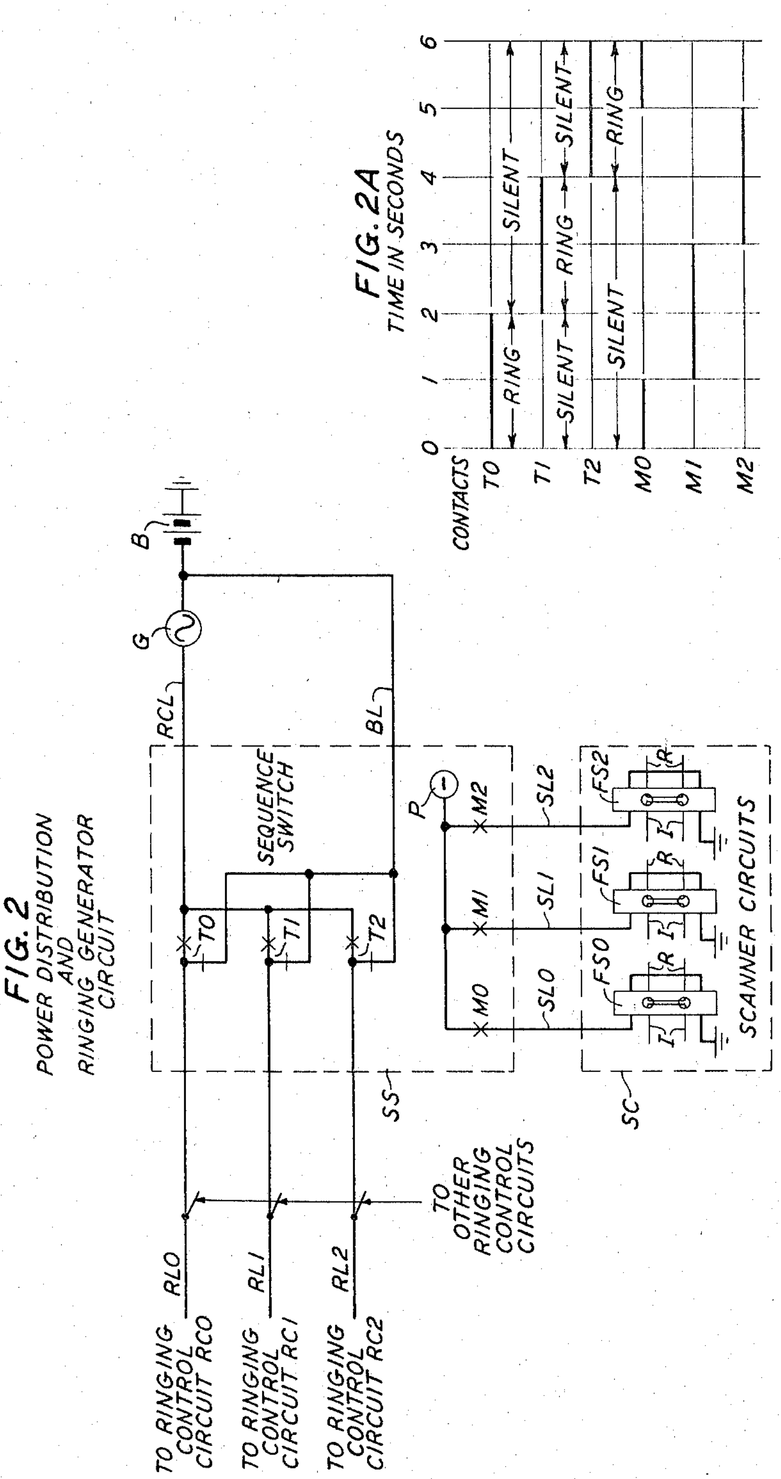
FIG. 2 shows schematically illustrative ringing circuitry comprising a power distribution and ringing generator circuit, as well as the scanner circuits according to my invention.
FIG. 2A is a sequence diagram which shows the times at which each of the transfer contacts T0–T2 and make contacts M0–M3 of the sequence switch SS of FIG. 2 is actuated.

Referring now to FIG. 2, a detailed description is presented of the structure and operations of the power distribution and ringing generator circuit PDC, as well as the scanner circuits SC embodying features of the present invention. It is noted that the apparatus of FIG. 2 is placed in different circuits in order to conform to the equipment philosophy of the Doblmaier et al. disclosure and it is clear that this apparatus may be physically located in one equipment unit or in each of the ringing control circuits RC0–RC2 of FIG. 1. This apparatus forms a switching circuit which provides communication paths from the exemplary twenty-cycle ringing power generator G and battery B over the leads RCL and BL, respectively, to the output ringing leads RL0–RL2 extending to the ringing control circuits RC0–RC2 of FIG. 1. These paths are successively established by means of the transfer contacts T0–T2 of the sequence switch SS.

The entire mechanism of the sequence switch SS is not schematically represented in FIG. 2 inasmuch as the mechanism of such switches forms no part of this invention and is well known in the art. To elaborate, a sequence switch suitable for use in the exemplary embodiment of my invention may be of the general design similar to the ringing interrupter device disclosed by J. Atkinson in the publication entitled "Telephony," vol. 1, pages 443–445, FIG. 626, published by Pitman in 1948. The mechanism of such a switch consists of a plurality of rotating cam units, metallic contacts (transfers and makes), reduction gearing, and a driving motor. Each of the cam units comprises a shaft on which the cams are mounted and which shaft is operatively associated with the reduction gearing. When the driving motor is energized, it actuates the gearing and causes the cams to rotate. Each of these cams is provided with notches about its periphery and, when rotated, make and break the metallic contacts in a sequence determined by the cutting of the cam notches. The contacts of such a switch are represented in FIG. 2 as the transfer contacts T0–T2 and the make contacts M0–M2. These transfer and make contacts are actuated for this specific embodiment in sequences depicted in FIG. 2A.

Each of the contacts M0–M2 (represented by an X crossing a line) is associated with one of the ferrod sensor devices FS0–FS2 in the scanner circuits SC and connects the negative potential P thereto via one of the scan leads SL0–SL2. Such a ferrod device is a sensing element which senses the presence or absence of current flow through the associated one of the leads SL0–SL2. The presence of current in these leads indicates that ringing power is or will, within one second, be connected to the correspondingly numbered one of the ringing leads RL0–RL2. The absence of current on a scan lead indicates that ringing power is either not connected to or, as described hereinafter, is to be disconnected within one second from the correspondingly numbered one of the lead RL0–RL2.

A ferrod comprises a rod or stick of ferrite material which in closed flux paths exhibits remanent flux switching characteristics, but which is substantially nonremanent about its elongated, open flux path dimension. Around the stick are wound a pair of control windings, and the pair of control windings of each of the ferrods FS0–FS2 is serially connected. Ferrods FS0–FS2 each have one such winding terminal connected to ground potential and another connected to an individual one of the leads SL0–SL2. In addition, each of the ferrods FS0–FS2 comprises an interrogate winding I and a read-out winding R, each of which is threaded through a pair of holes in the ferrite rod, the periphery of the holes exhibiting remanent switching characteristics. Ferrods are further disclosed in J. A. Baldwin, Jr.-H. F. May patent application Ser. No. 26,758, filed May 4, 1960, now U.S. Patent No. 3,175,042, issued Mar. 23, 1965.

When current flows through the control windings of a ferrod, the ferrite rod is saturated and its incremental permeability approaches that of air. The permeability of the rod is, however, relatively high when no current flows through the ferrod control windings. This high-low permeability characteristic of the rod is utilized for enabling the device to sense the current and no current signals on leads SL0–SL2 and for interrogating and reading-out the sensed signals.

During the scanning operation, the central processor CP causes an electrical pulse to be applied in parallel to the interrogate winding I of each of the ferrods FS0–FS2. If no current is flowing through the control windings of that ferrod, a pulse is coupled by transformer action to the read-out winding R of the same ferrod for indicating the absence of current on the associated one of the leads SL0–SL2. On the other hand, if current is flowing through the ferrod control windings, the ferrod is saturated and the interrogate pulse is essentially not coupled to the read-out winding R for indicating the presence of current on the associated one of the leads SL0–SL2.

The detailed operations of the power distribution and ringing control circuit PDC and scanner circuits SC may be best understood by describing the ordered sequence of the T0–T2 and M0–M2 contact operations which occur for monitoring and successively connecting either the twenty-cycle alternating current (AC) from generator G superimposed on the direct current (DC) from battery B or only the DC from battery B to the leads RL0–RL2. The AC superimposed DC is used for activating the telephone ringer (not shown) of the stations TS1–TSN (FIG. 1) and the DC is used for activating the trip ringing apparatus (not shown) of the ringing control circuits RC0–RC2 in a manner as disclosed in my copending application Ser. No. 403,989. In the exemplary embodiment, a ringing cycle consists of two seconds of ringing followed by four seconds of no ringing, or silence, as depicted in FIG. 2A.

According to the exemplary embodiment, each of the contacts T0–T2 is uniquely identified with the correspondingly numbered one of the contacts M0–M2. These contacts are actuated by the sequence switch SS in accordance with the chart depicted in FIG. 2A. Each of the contacts is recurrently actuated for a period of two seconds and then is released for a period of four seconds. The transfer contacts T0–T2 are successively actuated to connect ringing power (AC superimposed DC) from generator G and battery B successively to the ringing leads RL0–RL2 so that each of the ringing control circuits RC0–RC2 is successively active at a different time for controlling the immediate ringing of called telephone stations. The contacts M0–M2 are also successively actuated to operate the ferrods FS0–FS2 and thereby to cooperate with the central processor CP (FIG. 1) for monitoring when each of the control circuits RC0–RC2 is active for supplying ringing power to a called telephone line.

It is shown in FIG. 2A that, in this specific embodiment, each of hte contacts M0–M2 is actuated for one second prior to and for only one second during the two-second actuation of the correspondingly numbered one of the contacts T0–T2. This arrangement is used so that the central processor CP knows which one of the ringing control circuits RC0–RC2 will be active to supply ringing power immediately or within less than one-second after a service request. The one-second advanced indication thus provided to the processor CP by the contacts M0–M2 is used as a guard interval to insure that, after a service request, connections may be established from an active one of the circuits RC0–RC2 through the networks TLN and LLN (FIG. 1) to a called telephone line. It also insures that the active ringing control circuit has sufficient time to conduct the tests for excessively low leakage resistance and foreign potentials as disclosed in my aforementioned copending application before it connects immediately available ringing power to the called line. The last one-second of the active ringing period of a ringing control circuit is not recognized by the scanner circuits SC and processor CP so that short and relatively inadequate ringing power bursts are not supplied to a called line during the last milliseconds of the ringing period for activating the associated telephone ringer. It has been found that the ringer activations caused by such short power bursts are generally ineffective for properly alerting the called party to the presence of an incoming call. Moreover, such short power bursts are followed by four seconds of silence, or no ringing, which only unnecessarily delay the proper alerting of the called party. An advantage of my invention resultant from the exemplary sequences of the T0–T2 and M0–M2 contacts is that ringing power is always supplied to a called line either immediately or within less than one second after the ringing generator G and battery B are connected thereto.

In light of my teaching, it will be apparent to those skilled in the art that the time sequence for actuating the contacts T0–T2 and M0–M2 may be modified in many ways (even so that the correspondingly numbered ones of these contacts are always concurrently actuated) to provide the immediate ringing feature. In addition, it is to be understood that certain of the power cross and leakage tests performed by the ringing control circuits may be deleted when it is further desired to speed the alerting of called customers.

Referring now to FIG. 2A, it is noted that at time equal to zero, the contacts M0 and T0 are actuated under control of the switch SS. The actuation of contact M0 energizes the ferrod FS0 over the path including potential P, lead SL0 and the ferrod control windings to ground. The energized state of ferrod FS0 enables the scanner circuits SC and processor CP to determine during the scanning operation that the ringing control circuit RC0 and the other such circuits connected in multiple to the lead RL0 are active for supplying ringing power to called lines. The actuated make portion of the transfer contact T0 connects the lead RL0 in a series circuit with lead RCL, generator G and battery B. At the same time, the ringing control circuits RC1 and RC2 and other such circuits connected in multiple with the leads RL1 and RL2 are inactive inasmuch as generator G is disconnected therefrom and the battery B is connected to each such circuit over lead BL through the break portion (represented by a vertical bar crossing a line) of the contacts T1 and T2 for enabling these circuits to detect called party answer conditions and to trip ringing current in a manner as disclosed in my aforementioned copending application. Any called line which is connected to one of the active ringing control circuits in a manner as described in Doblmaier et al. remains connected thereto until either the called party answers and that active circuit is released from the call or until the caller abandons the call. During the establishment of the latter connections, the ringer of the called phone is recurrently activated for two seconds of each six-second cycle.

At the time equal to one second, the contact M0 is opened to de-energize the ferrod FS0 and the contact M1 is actuated to complete the obvious path for energizing ferrod FS1. The energization of ferrod FS1 enables the scanner circuits SC and processor CP to determine during the scanning operation that the next group of active ringing control circuits available for supplying instantaneous ringing power to called lines is the group associated with lead RL1. The processor CP may then connect such calling lines individually to these circuits and the circuits test the lines for leakage and foreign potential and then connect them to the lead RL1 to receive ringing power in a manner as described in my previously identified copending application.

The transfer contact T0 is released at the two-second mark to disconnect the generator G from the lead RL0 at its make contact and to connect thereto only the battery B via its break contact so that called party answer signals may be detected. At the same time, the transfer contact T1 is actuated to connect the lead RL1 in a series circuit with the lead RCL, generator G, and battery B to ground for supplying ringing power to the associated group of ringing control circuits.

After three seconds have elapsed, the make contact M1 is opened to de-energize ferrod FS1 and contact M2 is actuated to energize ferrod FS2. The processor CP via scanner circuits SC detects the energization of ferrod FS2 during the scanning operation and determines that the group of ringing control circuits available for supplying instantaneous ringing power to called lines are those associated with lead RL2. Thereafter, processor CP connects calling lines individually to these circuits which then, as previously explained, test the lines for leakage resistances and foreign potential and subsequently connect them to lead RL2 to receive ringing power.

Transfer contact T1 is released after the fourth second depicted in FIG. 2A to disconnect the generator G from lead RL1 at its make contact. In addition, the lead RL1 remains connected to battery B via the break contact of transfer T1 so that called party answer signals may be detected by the ringing control circuits associated therewith. The transfer contact T2 is then actuated to connect battery B and generator G in series with lead RL2 for supplying ringing power to the associated group of ringing control circuits.

When five seconds have expired, the make contact M2 is opened to de-energize ferrod FS2 and contact M0 is again actuated to energize ferrod FS0 for informing the processor CP via scanner circuits SC that the group of ringing control circuits associated with lead RL0 again are available for supplying instantaneous ringing power to called lines.

After six seconds, the transfer contact T2 is released to disconnect the generator G from lead RL2 at its make contact and to reconnect thereto only the battery B via its break contact. Concurrently, the transfer contact T0 is reactuated to repeat the operations previously described with respect to the time equal to zero.

Reference is made to copending application Ser. No. 417,342, filed Dec. 10, 1964, of R. M. Swanson, now Patent 3,350,508, issued Oct. 31, 1967, wherein a related invention is described.

It is to be understood that the hereinbefore described arrangements are illustrative of the application of the principles of my invention. In light of this teaching, it is apparent that numerous other arrangements may be devised by those skilled in the art without departing from the spirit and scope of the invention.

What is claimed is:

1. In combination, a plurality of communication stations, a switching network operable for establishing communication connections to any of said stations, and means for altering any one of said stations to the receipt of call communications therefor, said alerting means comprising a plurality of outputs, means recurrently supplying individual alerting signals to each of said outputs, said signals at each of said outputs being effective for alerting each of said stations and being time-spaced with respect to the signals at the other of said outputs, and means responsive to the receipt of a call for operating said network to connect any called one of said stations to the one of said outputs concurrently supplied with said signals for immediate alerting of said called one of said stations.

2. The combination in accordance with claim 1 wherein said alerting signal supplying means comprises means for generating an alternating current signal connectable to each of said outputs and a sequence switch having a plurality of switching elements sequentially operative for successively connecting the generated signal(s) individually to each of said outputs for further connection through said network to alert any one of said stations.

3. The combination in accordance with claim 2 wherein said switching elements include a plurality of make contacts and further comprising a direct current source serially connected with said generating means for supplying said generating alternating current signal superimposed on direct current throught said contacts to each of said outputs.

4. The combination in accordance with claim 3 wherein said sequence switch further comprises a plurality of break contacts for connecting said direct current source to said outputs during the periods that said generated signals are disconnected from said outputs.

5. A communication switching system comprising means for recurrently generating a ringing signal, distribution means having a plurality of outputs and means operative for successively connecting the generated signal individually to each of said outputs for discrete time periods, means activated by said distribution means for determining the one of said outputs currently having said signals connected thereto, a plurality of communication lines, and means controlled by said determining means and responsive to the receipt of a call for connecting said one output to any called one of said lines immediately to receive said ringing signal.

6. A communication switching system in accordance with claim 5 wherein said determining means comprises a plurality of electrical devices each being associated with one of said outputs and operable for monitoring the connection of said generated ringing signal to the associated output, a source of potential, and an array of switching elements activated by said distribution means for connecting said potential to each of said devices at a prescribed period during the connection of said ringing signals to the associated output.

7. A communication switching system in accordance with claim 6 wherein said each of said electrical devices comprises a ferrod sensor having at least one control winding and said array of switching elements comprises a plurality of make contacts recurrently activated by said distribution means for successively connecting said potential individually to each of said control windings for energizing each of said respective ferrod sensors to monitor said associated outputs currently having said generated signals connected thereto.

8. A communication switching system comprising a plurality of ringing control circuits each being operative for supplying different active phases of ringing signals, means for monitoring the occurrence of each of said active ringing phases of each of said circuits, a plurality of communication lines, and connector means controlled by said monitoring means and responsive to the receipt of a call for any one of said lines for selectively connecting the called one of said lines to the one of said circuits concurrently supplying the active phase of ringing signals for immediate ringing on said called one of said lines.

9. A communication switching system in accordance with claim 3 wherein said connector means includes means for selectively connecting said called one of said lines to another of said ringing control circuits when said currently active phase of ringing signals has been supplied to said one ringing circuit for a prescribed period.

10. Signaling equipment comprising a source of signaling power, a plurality of signal outputs, switching means recurrently operative for successively connecting each of said outputs individually to said source, a plurality of scannable devices each being associated with an individual one of said outputs and being selectively activated by said switching means for sensing when said associated one of said outputs is connectable to said source, and means operative for scanning said devices to determine the one of said outputs connectable to said source within a prescribed interval.

11. In a telephone system, telephone lines, a switching network operable for establishing connections to said lines, means for generating ringing signals, a plurality of ringing control circuits for connecting the generated ringing signals via said network connections to any of said lines, switching means for successively connecting said generated signals to each of said circuits, means activated by said switching means for monitoring each of said circuits to determine which one of said circuits is available for connecting said generated signals to any of said lines, and means controlled by said monitoring means and responsive to the receipt of a call for operating said network to establish connections between the called one of said lines and a determined available one of said circuits.

12. In a telephone system, telephone lines, a switching network operable for establishing call connections to said lines, means for recurrently generating ringing signals, a plurality of ringing control circuits each operable for supplying the generated ringing signals via said network connections to any of said lines, means for successively connecting said generated signals individually to each of said circuits, means responsive to the receipt of a call to one of said lines for selecting the one of said circuits concurrently having said signals connected thereto, means responsive to said selection for operating said network to establish connections between the called one of said lines and said selected circuit, and means for subsequently operating said selected circuit to supply said ringing signals to said established connections.

13. In a telephone system, telephone lines, a digit receiver, a link connector selectively operable for establishing connections between any one of said lines and said receiver, means for monitoring for a calling service request from any of said lines, common control means responsive to the receipt of a service request by said monitoring means for selectively operating said connector to establish connections between the calling line and said receiver, means controlled by said control means for storing digits identifying a called one of said lines, means responsive to the receipt of such digits in said receiver for transferring said digits to said storing means, means for generating ringing signals, a plurality of ringing control circuits operable for connecting the generated ringing signals to said link connector, switching means for successively connecting said generated signals individually to each of said circuits, a plurality of scannable devices each being associated with one of said circuits and being selectively activated by said switching means for sensing when the associated one of said circuits is available for connection to said source within a prescribed interval, means in said control means for scanning said devices to determine the currently available one of said circuits, means responsive to the storage of said digits in said storing means for selectively operating said link connector to establish connections between said determined available one of said circuits, and said called one of said lines, and means in said control means for subsequently operating said available one of said circuits for connecting said generated ringing signals via said established connections to said called one of said lines.

14. In combination, a plurality of communication stations, switching means operable for establishing communication connections to any of said stations, and means for alerting any one of said stations to the receipt of call communications therefor, said alerting means comprising ringing means for cyclically providing active intervals of ringing signals, and means for operating said switching means to connect said ringing means to said one station initially only during one of said active intervals.

References Cited

UNITED STATES PATENTS

| | | | |
|---|---|---|---|
| 3,005,053 | 10/1961 | Schmidt | 179—18.82 |
| 3,035,250 | 5/1962 | Durkee et al. | 179—84 |
| 3,085,133 | 4/1963 | Hutton | 179—18.82 |
| 3,283,082 | 11/1966 | Vigliante | 179—18.82 |

WILLIAM C. COOPER, *Primary Examiner.*

KATHLEEN H. CLAFFY, *Examiner.*

L. A. WRIGHT, *Assistant Examiner.*